June 1, 1965 F. E. CHANCELLOR ET AL Re. 25,786

DEEP WELL PUMPING SYSTEM

Original Filed May 15. 1961

FORREST E. CHANCELLOR
ROBERT O. CHANCELLOR
INVENTORS.

BY

ATTORNEY.

United States Patent Office

Re. 25,786
Reissued June 1, 1965

25,786
DEEP WELL PUMPING SYSTEM

Forrest E. Chancellor and Robert O. Chancellor, both of 2917 Pierce Road, Bakersfield, Calif.

Original No. 3,044,414, dated July 17, 1962, Ser. No. 110,194, May 15, 1961. Application for reissue July 10, 1964, Ser. No. 393,801
11 Claims. (Cl. 103—179)

Matter enclosed in heavy brackets [ ] appears in the original patent but forms no part of this reissue specification; matter printed in italics indicates the additions made by reissue.

This invention relates to oil well production equipment and particularly to a novel pumping system employing sucker rods as a pump actuating medium.

The problems inherent in the use of a string of sucker rods reaching from the top of the well to a reciprocating pump near the bottom thereof for actuating the plunger of said pump, increase inversely with the gravity of the oil being pumped. That is, the lower the gravity of the oil the greater the difficulties met with in operating the pump in the well through a string of sucker rods.

These problems spring mainly from the increased viscosity of oil as the gravity decreases. The greater the viscosity of the oil, the greater is the resistance imposed by the oil to the stroke of the plunger in either direction in the pump barrel. On the upstroke the sucker rods and the surface reciprocator are quite adequate to overcome this increase in viscosity, but on the downstroke, the weight of the sucker rod imposed on the pump plunger is inadequate to overcome the viscosity of low gravity oil so as to cause the plunger to drop as rapidly as the reciprocator returns downwardly at the upper end of the well. This results in placing the sucker rod under compression on the downstroke unless an overriding connection is made between the upper end of the sucker rod and the reciprocator, and in any event prevents a full pump stroke being accomplished thereby greatly decreasing the efficiency of the pump.

Many expedients have been devised in the effort to overcome the problem above described. These have included applying weights to the sucker rod just above the pump plunger and lowering the viscosity of oil at the pump level by circulating hot water in the well. The weights installed in the first of these expedients decrease the cross-sectional area of the space in the pump tubing for travel of the oil upwardly from the pump and thus increase the friction of the oil on the plunger so that the net gain is unsatisfactory. The heating of the oil at the pump requires on expensive installation including two auxiliary pipes running clear down the hole to the pump, as well as a circulating hot water pump and boiler at the surface. Efficient use of this equipment involves constant maintenance expense and necessitates the production equipment being pulled oftener than otherwise necessary. It also takes almost twice as long to pull this equipment and put the well back on production.

It is a primary object of the present invention to provide a well pumping system employing sucker rods as a motion transmitting medium, which will substantially reduce the problems above mentioned and heretofore met with in pumping low gravity oil.

It is a specific object of the invention to provide such a pumping system which will introduce no maintenance problem but will on the other hand enable a pump handling low gravity oil to accomplish a full stroke in its regular operation thus greatly increasing the efficiency of the pump and the production from the well in which it is operating.

Another specific object of the invention is to provide such a well pumping system which will overcome the impedance of the plunger of a pump handling low gravity oil whereby the reciprocator may be operated at maximum speed, a thing heretofore impossible, and thus still further increase the production of oil from the well.

A still further object of the present invention is to provide such a well pumping system employing sucker rods as a motion transmitting medium in which the string of rods will be kept constantly in tension throughout the operating cycle of the pump thereby lengthening the life of the rods as well as that of the surface reciprocator on which the rods are suspended.

The manner of accomplishing the foregoing objects as well as further objects and advantages will be made manifest in the following description taken in connection with the accompanying drawings in which.

Figure 1:
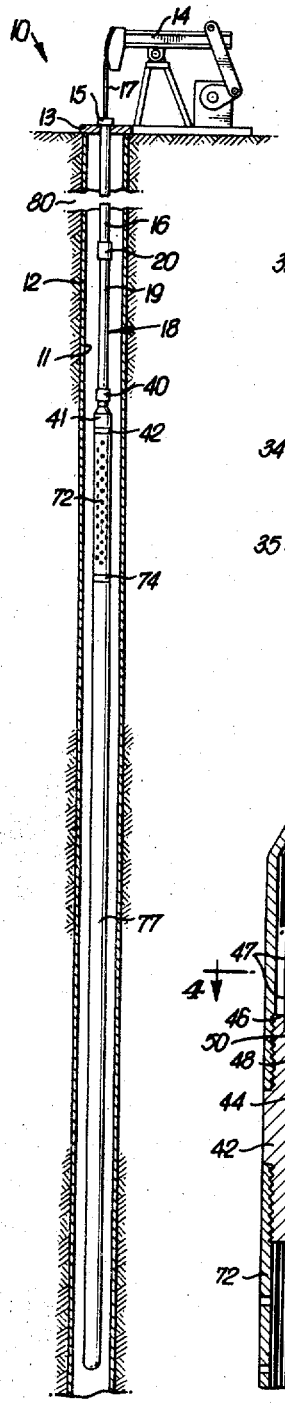
FIG. 1 is a diagrammatic vertical sectional view of a deep oil well with a preferred embodiment of the present invention installed therein as part of the equipment for oil production from said well.

Referring specifically to the drawings, a preferred embodiment of the pumping system 10 of the invention is diagrammatically shown in FIG. 1 as including a deep well 11 having a casing 12 and a centrally apertured casing head 13. Mounted on the surface of the ground at the top of the well 11 is a rod reciprocator 14. Suspended within the casing 12 by a collar 15 at its upper end is a string of tubing 16. Suspended on the reciprocator 14 and extending downwardly through the collar 15 and tubing string 16 is a sucker rod 17.

The invention includes a reciprocating deep well pump 18 this pump having a barrel 19 which is connected by a collar 20 to the lower end of tubing string 16 and has an inside diameter slightly less than said tubing string. A pump plunger 25 is connected to the lower end of sucker rod string 17 so as to be reciprocably slidable in the barrel 19.

The plunger 25 has a body 26 including a tubular liner 27. An upper portion of body 26 forms a ball cage 28 which terminates at its upper end in a pin 29 onto which the lower end of the sucker rod string 17 screws. The cage 28 confines a traveling valve ball 30 which rests on a seat provided at the upper end of a passage 32 which connects with the liner 27. Fixed on the lower end of liner 27 is a connector 33 having ports 34 and an axial bore 35 which is tapped to provide the same with relatively coarse right hand threads. The mouth of bore 35 is flared for a reason which will be made clear hereinafter.

Joined to the lower end of pump barrel 19 by a collar 40 is an adapter 41 the lower end of which is internally threaded and is of a substantially larger diameter than the barrel 19.

Screwed into the lower end of adapter 41 is the externally threaded upper end of a standing valve head 42. The lower end of this head is also externally threaded and the head has an axial bore 43 and two fluid passages 44 which are parallel with the bore 43 and have standing valve ball seats at their upper ends. Confined within cages 45, which are mounted on the upper end of the head 42, are standing valve balls 46 which naturally gravitate downwardly to rest on said standing valve seats. The cages 45 comprise thin-walled shells closed at the upper end and provided with a substantial number of vertical slots 47 for allowing free passage of liquid through these cages.

The bore 43 is provided with suitable internal annular grooves for retaining O-rings 48 and 49.

Surrounding the bore 43 and resting on the upper end of head 42 is a short coil spring 50 which supports plates 55 of a standing valve opening device 56 which are hingedly connected at 57 and have tongues 58 which extend through adjacent slots 47 in the cages 45 so that downward pressure on the valve opener 56 compresses the spring 50 and extends the tongues 58 into engagement with the balls 46 so as to unseat these and allow production fluid to flow downwardly through the standing valve passages 44.

Figure 2:
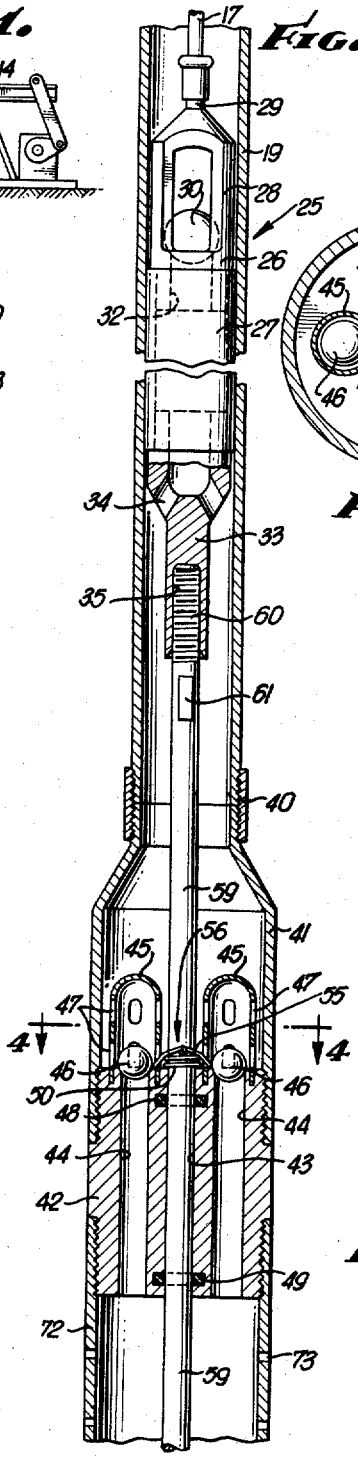
FIG. 2 is an enlarged diagrammatic vertical sectional view of an upper portion of said equipment.
Figure 3:
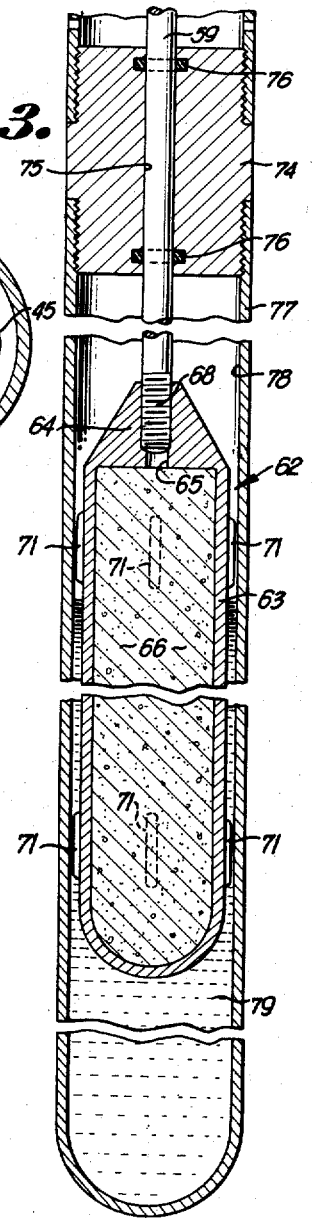
FIG. 3 is a vertical fragmentary diagrammatical sectional view of a lower portion of the equipment shown in FIG. 1.
Figure 4:
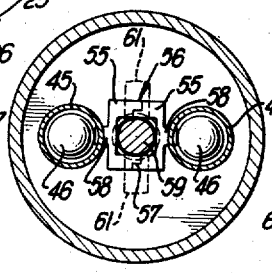
FIG. 4 is an enlarged cross-sectional view taken on the line 4—4 of FIG. 2 and illustrates the foot valve relief mechanism of the invention which permits the pump tubing on which the invention is mounted to be pulled dry.

Extending slidably through the central opening in the valve opener 56 and through the coil spring 50 and through the bore 43 and O-rings 48 and 49 is an operating shaft 59 having threads 60 at its upper end which are adapted to readily screw into the threads provided in the tapped bore 35 of the connector 34 on the plunger 25. Also provided on the shaft 59 just below the threads 60 is a pair of lugs 61 which extend in diametrically opposite directions from the shaft 59 and are adapted to come to rest on the valve opener 56 when the shaft 59 is lowered from the position in which it is shown in FIG. 2 so as to actuate said valve opener and open the standing valve balls 46 as above described. The lugs 61 are also adapted to bear the weight of the shaft 59 when it is thus lowered so that when the sucker rod string 17 is rotated so as to rotate the plunger 25 and unscrew the connector 34 from the shaft 59, the latter will be supported on the head 42. The lugs 61 also come to rest, when supported on the head 42, between the cages 45 which prevents rotation of the shaft 59 during the process of screwing the connector 34 onto the threads 60 or unscrewing said connector therefrom.

The shaft 59 extends downwardly below the head 42 a substantial distance and has suspended from the lower end thereof a very heavy weight 62. This weight is made up of a hollow shell 63 which is closed at the lower end and has a head 64 at its upper end, the latter having an axial bore 65 through which shot 66 may be poured into the shell 63 to give the weight 62 a predetermined mass. An upper portion of the bore 65 is tapped to permit a threaded lower end portion 68 of the shaft 59 to be screwed thereinto to mount the weight 62 on said shaft and to close the shell 63. Provided externally on the shell 63 are a series of vertically disposed guide fins 71 the purpose of which will be made clear hereinafter.

Screwed onto the threaded lower end portion of upper head 42 is the internally threaded upper end portion of a perforated tubing section 72 having a relatively large number of perforations 73 formed therein for the admission of production fluid. The lower end of tubing section 72 is internally threaded and screws onto the threaded upper end portion of a second head 74, this head having an axial bore 75 which is counterbored to mount O-rings 76 therein, said bore and O-rings slidably receiving shaft 59 so as to make a fluid-tight fit with the latter. A lower portion of lower head 74 is externally threaded to screw into internal threads provided in the upper end of a shell 77 which surrounds the weight 62 and combines with the head 74 to form a fluid-tight chamber 78 in which the weight 62 is freely slidable vertically, this weight being held by the fins 71 in centralized relation with the walls of the shell 77. The chamber 78 contains a body of lubricating liquid 79. This liquid is of low viscosity and is merely provided to prevent contact of the fins 71 with the shell 77 causing excessive wear. The liquid 79 is provided only in sufficient quantity to accomplish this function and a substantial upper portion of the chamber 78 is occupied by a gaseous medium mainly comprising air introduced at the top of the well when assembling the apparatus. It should be noted that the static pressure of the body of gas thus confined in the upper portion of the chamber 78 will be of a much lower order than the ambient fluid static pressure outside the shell 77 and at the same level therewith in the well 11.

OPERATION

At the outset it is to be noted that the vertical portion of the well 11 removed by the horizontal break 80 in the illustration of FIG. 1 constitutes by far the greater portion of the length of the well. The pump 18 is accordingly disposed near the lower end of the well and is immersed in a body of production liquid 81 which it is desired to pump from the well. The pump 18 may therefore be anywhere from 800 to 8000 feet below the top of the well. Although FIG. 1 is a diagrammatic representation of the apparatus, the portion of this apparatus below the break 80 is drawn substantially to scale. In the example illustrated, the distance from the collar 40 to the lower end of weight housing shell 77 is approximately 27 feet and the outside diameter of the adapter 41, head 42, perforated tubing section 72, head 74 and shell 77 is 4½ inches. The shell 77 is 22 feet in length and the weight 62 is 15 feet in length.

The installation and pulling of equipment being a vital part of oil well production procedure, it is to be noted that the installation of the apparatus of the system 10 starts with an assembly of all the apparatus below the collar 40 and with the lugs 61 resting on the standing valve opener 56 so that the load of weight 62 is borne by the head 42. This part of the apparatus is then connected to the lower end of the pump barrel 19, the latter secured onto the lower section of tubing string 16 which is progressively assembled as it is being lowered into the well until the entire tubing string 16 is in the well and is suspended by the collar 15 on the casing head 13.

The pump plunger 25 is now secured to the lower end of the sucker rod string 17 and the latter run into the well, as it is being assembled, to lower the plunger until the mouth of the tapped bore 35 of the connector 33 on the plunger comes to rest on the upper end of the threaded upper section 60 of the shaft 59. When this occurs, the sucker rod string 17 is rotated in a clockwise direction to screw the connector 33 onto the upper end of the shaft 59. This connects the plunger 25 to said shaft which is now raised about a foot by lifting on the sucker rod string 17 after which the latter is connected to the reciprocator 14 with the head of the latter in its downwardmost position. The reciprocator 14 is now set in operation to cause a vertical reciprocation of the sucker rod string 17, the plunger 25, the shaft 59 and the weight 62.

Moving as it does in a relatively non-viscous medium both as to the air at the upper end of chamber 78 and the light lubricating liquid 79 in the lower end of said chamber, the weight 62 is free to drop rapidly in the chamber 78 and during each downstroke of the plunger 25 the weight 62 supplies a powerful downward accelerating force to said plunger which contributes very substantially to overcoming the retarding forces of the viscous liquid being pumped by the pump 18. Another factor in the system 10 contributing to the rapid downward movement of the plunger 25 during the downstroke of the reciprocator 14 is the relatively low pressure of the liquid and gaseous media surrounding the weight 62 in the chamber 78. This low pressure results in the tremendous hydrostatic head, under which the pump plunger 25 is operating, applying a very substantial net downward pressure on the plunger 25 during its downstroke. This net downward pressure of course varies with the extent to which the cross-sectional area of the shaft 59 exceeds the cross-sectional area of the sucker rod string 17. While, for illustrative purposes, the shaft 59 is shown in the drawings as not greatly exceeding the sucker rod 17 in diameter, it is to be understood that the shaft 59 may be made with considerably larger diameter than shown in the drawings wherever this is warranted by the pumping conditions met with.

The invention disclosed herein is not merely a theoretical solution of the problem above described. It has been installed in a well near Bakersfield, California, which is 1000 feet deep, pumping with a 34 inch stroke at 8½ strokes per minute. The pump is a 2¼ inch tubing liner pump with .003 clearance. Production fluid is 12 gravity. The well was first pumped in a conventional way and its production was 88 barrels per 24 hours. The present invention was then installed in association with identically the same pump and in the same well and production rose to 128 barrels per 24 hours. The tremendous gain in production thus effected by the present invention caused the well owner to insist that this equipment, although experimental, be sold to him and it is still operating at the time of filing this application in the same well at the increased rate of production above noted.

In the pumping system 10, the withdrawal of the plunger 25 and sucker rod string 17 from the tubing string 19 may be effected at any time for repairs or replacement merely by lowering the plunger until the lugs 61 are supported on the head 42 with these lugs located between the cages 45 and then rotating the sucker rod string 17 in a counterclockwise direction so as to unscrew the connector 33 from the threaded upper end 60 of the shaft 59. The plunger 25 is then lifted upwardly out of the pump barrel 19 whereupon the production liquid above the plunger will leak downwardly past the plunger as this continues upwardly through the pump tubing string 16. Owing to the lugs 61 being left resting on the valve opener 56, the standing valve balls 26 will be displaced from their seats so that the production liquid flowing downward past the plunger 25 will also escape downwardly through the valves 46 and the perforations 73 in the tubing section 72 until the production liquid inside the tubing string 16 is at the same level as the production liquid outside said tubing string in the well 11.

While only a single specific embodiment of the invention has been illustrated herein, it is understood that variout changes and modifications might be made in this without departing from the spirit of the invention or the scope of the appended claims.

The claims are:

[1. In a well pumping system the combination of: a string of production tubing reaching down from the top of the well; a pump barrel secured to the lower end of said tubing string; a plunger reciprocable in said barrel; a string of sucker rods connected at its lower end to said plunger and extending upwardly through said tubing string; a reciprocator at the top of the well on which reciprocator said rod string is suspended and by which said plunger is reciprocated in said barrel; a head connected to and closing the lower end of said barrel; standing valve means in said head, there being an axial bore in said head; a shaft suspended from said plunger and slidable in said bore with a fluid-tight fit; and a heavy weight suspended on the lower end of said shaft to accelerate the downward stroke of said plunger.]

2. *In a well pumping system the combination of: a string of production tubing reaching down from the top of the well; a pump barrel secured to the lower end of said tubing string; a plunger reciprocable in said barrel; a string of sucker rods connected at its lower end to said plunger and extending upwardly through said tubing string; a reciprocator at the top of the well on which reciprocator said rod string is suspended and by which said plunger is reciprocated in said barrel; a head connected to and closing the lower end of said barrel; standing valve means in said head, there being an axial bore in said head; a shaft suspended from said plunger and slidable in said bore with a substantially fluid-tight fit; a weight suspended on the lower end of said shaft to accelerate the downward stroke of said plunger;* [A combination as in claim 1 in which] a perforated casing [is] connected to the lower end of said head; a second head connected to the lower end of said casing, said second head having an axial bore through which said shaft slidably extends with a fluid-tight fit; *and* an imperforate tubular shell closed against the admission of fluid at the lower end and connected at its upper end to said second head to form a *substantially fluid* tight chamber for the exclusion of fluid from entering said shell, said weight being freely slidable in said chamber as said plunger reciprocates.

3. *In a well pumping system the combination of: a string of production tubing reaching down from the top of the well; a pump barrel secured to the lower end of said tubing string; a plunger reciprocable in said barrel; a string of sucker rods connected at its lower end to said plunger and extending upwardly through said tubing string; a reciprocator at the top of the well on which reciprocator said rod string is suspended and by which said plunger is reciprocated in said barrel; a head connected to and closing the lower end of said barrel; standing valve means in said head, there being an axial bore in said head; a shaft suspended from said plunger and slidable in said bore with a substantially fluid-tight fit; a weight suspended on the lower end of said shaft to accelerate the downward stroke of said plunger; a perforated casing connected to the lower end of said head; a second head connected to the lower end of said casing, said second head having an axial bore through which said shaft slidably extends with a substantially fluid-tight fit; and an imperforate tubular shell closed against the admission of fluid at the lower end and connected at its upper end to said second head to form a substantially fluid-tight chamber for the exclusion of fluid from entering said shell, said weight being freely slidable in said chamber as said plunger reciprocates,* [A combination as in claim 2 in which] said shell chamber *being* [is] at least partly filled with a gas at a pressure substantially less than the ambient well pressure at the level of said shell.

4. *In a well pumping system the combination of: a string of production tubing reaching down from the top of the well; a pump barrel secured to the lower end of said tubing string; a plunger reciprocable in said barrel; a string of sucker rods connected at its lower end to said plunger and extending upwardly through said tubing string; a reciprocator at the top of the well on which reciprocator said rod string is suspended and by which said plunger is reciprocated in said barrel; a head connected to and closing the lower end of said barrel; standing valve means in said head, there being an axial bore in said head; a shaft suspended from said plunger and slidable in said bore with a substantially fluid-tight fit; a weight suspended on the lower end of said shaft to accelerate the downward stroke of said plunger; a perforated casing connected to the lower end of said head; a second head connected to the lower end of said casing, said second head having an axial bore through which said shaft slidably extends with a substantially fluid-tight fit; and an imperforate tubular shell closed against the admission of fluid at the lower end and connected at its upper end to said second head to form a substantially fluid-tight chamber for the exclusion of fluid from entering said shell, said weight being freely slidable in said chamber as said plunger reciprocates,* [A combination as in claim 2 in which] said shell chamber *being* [is] partially occupied by a body of liquid lubricant of relatively low viscosity and sufficient in quantity for said weight to be lubricated thereby, the balance of said chamber being occupied by said weight, by a lower portion of said shaft and by a body of gas.

5. *In a well pumping system the combination of: a string of production tubing reaching down from the top of the well; a pump barrel secured to the lower end of said tubing string; a plunger reciprocable in said barrel; a string of sucker rods connected at its lower end to said plunger and extending upwardly through said tubing string; a reciprocator at the top of the well on which reciprocator said rod string is suspended and by which said plunger is reciprocated in said barrel; a head connected to and closing the lower end of said barrel; standing valve*

*means in said head, there being an axial bore in said head; a shaft suspended from said plunger and slidable in said bore with a substantially fluid-tight fit; a weight suspended on the lower end of said shaft to accelerate the downward stroke of said plunger; a perforated casing connected to the lower end of said head; a second head connected to the lower end of said casing, said second head having an axial bore through which said shaft slidably extends with a substantially fluid-tight fit; and an imperforate tubular shell closed against the admission of fluid at the lower end and connected at its upper end to said second head to form a substantially fluid-tight chamber for the exclusion of fluid from entering said shell, said weight being freely slidable in said chamber as said plunger reciprocates,* [A combination as in claim 2 in which] the space in said shell chamber not occupied by said weight and a lower portion of said shaft[,] *being* [is] occupied by fluids of comparatively low viscosity and pressure compared to the viscosity and pressure of the well fluid being pumped and in which said shaft has a substantially larger cross-sectional area than said sucker rod string whereby a substantial net downward hydrostatic pressure is imposed on said plunger during each downstroke of the latter.

6. *In a well pumping system the combination of: a string of production tubing reaching down from the top of the well; a pump barrel secured to the lower end of said tubing string; a plunger reciprocable in said barrel; a string of sucker rods connected at its lower end to said plunger and extending upwardly through said tubing string; a reciprocator at the top of the well on which reciprocator said rod string is suspended and by which said plunger is reciprocated in said barrel; a head connected to and closing the lower end of said barrel; standing valve means in said head, there being an axial bore in said head; a shaft suspended from said plunger and slidable in said bore with a substantially fluid-tight fit; and a weight suspended on the lower end of said shaft to accelerate the downward stroke of said plunger,* [A combination as in claim 1 in which] the upper end of said shaft [is] *being* secured to said plunger by a means attachable to and detachable from said plunger by manipulation of said rod string whereby said plunger may be lowered into said tubing string and pump barrel after said tubing string and barrel are installed, and said plunger subsequently pulled independently of said barrel for servicing.

7. *In a well pumping system the combination of: a string of production tubing reaching down from the top of the well; a pump barrel secured to the lower end of said tubing string; a plunger reciprocable in said barrel; a string of sucker rods connected at its lower end to said plunger and extending upwardly through said tubing string; a reciprocator at the top of the well on which reciprocator said rod string is suspended and by which said plunger is reciprocated in said barrel; a head connected to and closing the lower end of said barrel; standing valve means in said head, there being an axial bore in said head; a shaft suspended from said plunger and slidable in said bore with a substantially fluid-tight fit; a weight suspended on the lower end of said shaft to accelerate the downward stroke of said plunger; and* [A combination as in claim 1 in which] means [is] [provided] for opening said standing valve means prior to pulling said tubing string from the well so that the latter may be pulled dry.

8. *In a well pumping system the combination of: a string of production tubing reaching down from the top of the well; a pump barrel secured to the lower end of said tubing string; a plunger reciprocable in said barrel; a string of sucker rods connected at its lower end to said plunger and extending upwardly through said tubing string; a reciprocator at the top of the well on which reciprocator said rod string is suspended and by which said plunger is reciprocated in said barrel; a head connected to and closing the lower end of said barrel; standing valve means in said head, there being an axial bore in said head; a shaft suspended from said plunger and slidable in said bore with a substantially fluid-tight fit; a weight suspended on the lower end of said shaft to accelerate the downward stroke of said plunger;* [A combination as in claim 1 in which] means operable by manipulation of said rod string [is provided] for connecting said shaft to or disconnecting the same from said plunger; and means actuated by said shaft and said weight for holding said standing valve means open when said plunger is disconnected from said shaft.

9. *In a well pumping system the combination of: a string of production tubing reaching down from the top of the well; a pump barrel secured to the lower end of said tubing string; a plunger reciprocable in said barrel; a string of sucker rods connected at its lower end to said plunger and extending upwardly through said tubing string; a reciprocator at the top of the well on which reciprocator said rod string is suspended and by which said plunger is reciprocated in said barrel; a head connected to and closing the lower end of said barrel; standing valve means in said head, there being an axial bore in said head; a shaft suspended from said plunger and slidable in said bore with a substantially fluid-tight fit; a weight suspended on the lower end of said shaft to accelerate the downward stroke of said plunger; means operable by manipulation of said rod string for connecting said shaft to or disconnecting the same from said plunger; and means actuated by said shaft and said weight for holding said standing valve means open when said plunger is disconnected from said shaft,* [A combination as in claim 8 in which] said connecting means [comprises] *providing* relatively coarse threads which may be connected or disconnected by rotation of said rod string; *and* stop means on said shaft adapted to be lowered to rest on said first head when said shaft and weight are not supported on said plunger and rod string[;], said standing valve opening means being engaged by said stop means, when the latter is so lowered, to open said standing valve means.

10. *In a well pumping system the combination of: a string of production tubing reaching down from the top of the well; a pump barrel secured to the lower end of said tubing string; a plunger reciprocable in said barrel; a string of sucker rods connected at its lower end to said plunger and extending upwardly through said tubing string; a reciprocator at the top of the well on which reciprocator said rod string is suspended and by which said plunger is reciprocated in said barrel; a head connected to and closing the lower end of said barrel; standing valve means in said head, there being an axial bore in said head; a shaft suspended from said plunger and slidable in said bore with a substantially fluid-tight fit; a weight suspended on the lower end of said shaft to accelerate the downward stroke of said plunger; means operable by manipulation of said rod string for connecting said shaft to or disconnecting the same from said plunger; and means actuated by said shaft and said weight for holding said standing valve means open when said plunger is disconnected from said shaft; said connecting means providing relatively coarse threads which may be connected or disconnected by rotation of said rod string; and stop means on said shaft adapted to be lowered to rest on said first head when said shaft and weight are not supported on said plunger and rod string, said standing valve opening means being engaged by said stop means, when the latter is so lowered, to open said standing valve means,* [A combination as in claim 9 in which] said head is provided with a member which said stop means, when lowered, engages so as to prevent rotation of said shaft whereby said coarse threads may be connected or disconnected by rotation of said sucker rod string.

*11. A well pumping apparatus, for a well having fluid therein, an elongated string of tubing extended into the well with the tubing providing a fluid discharge passage from the well, and a sucker rod string mounted for re-*

*ciprocation in the tubing, comprising a pump barrel having an upper end connected to said tubing string and immersed within the fluid in the well and an opposite lower end; a plunger disposed within said barrel for reciprocation therein and connected to said sucker rod string for reciprocation therewith alternately in an upwardly traveling power stroke and a downwardly traveling return stroke; valve means disposed within said barrel in spaced relation to the plunger alternately to open and to block flow of well fluid therethrough incident to reciprocation of the plunger; an imperforate tubular shell extended from the lower end of the barrel; and plunger biasing means disposed within said shell urging the plunger downwardly and placing the sucker rod string under tension, said biasing means including a reservoir of non-viscous fluid contained in the shell and isolated from well fluid.*

*12. A well pumping apparatus, for a well having fluid therein, an elongated string of tubing extended into the well with the tubing providing a fluid discharge passage from the well, and a sucker rod string mounted for reciprocation in the tubing, comprising a pump barrel connected to said tubing string and immersed within the fluid in the well; a plunger disposed within said barrel for reciprocation therein and connected to said sucker rod string for reciprocation therewith; valve means disposed within said barrel in spaced relation to the plunger alternately to open and to block flow of well fluid therethrough incident to reciprocation of the plunger; shell means extended from the barrel; and plunger biasing means disposed within said shell means urging said plunger downwardly placing said sucker rod string under tension with the shell means isolating said biasing means from well fluid.*

References Cited by the Examiner

The following references, cited by the Examiner, are of record in the patented file of this patent or the original patent.

UNITED STATES PATENTS

| | | | |
|---|---|---|---|
| 1,929,827 | 10/33 | Roberts | 103—179 X |
| 2,138,002 | 11/38 | Hall | 103—179 |
| 2,213,807 | 9/40 | Starbuck | 103—179 X |
| 2,429,848 | 10/47 | Smith | 103—179 |

FOREIGN PATENTS

| | | |
|---|---|---|
| 26,580 | 1902 | Great Britain. |

LAURENCE V. EFNER, *Primary Examiner.*

WARREN E. COLEMAN, *Examiner.*